Jan. 15, 1946.  J. J. BLACK  2,393,016
SEMI-TRAILER ATTACHMENT AND SUPPORT
Filed Nov. 15, 1943  2 Sheets-Sheet 1
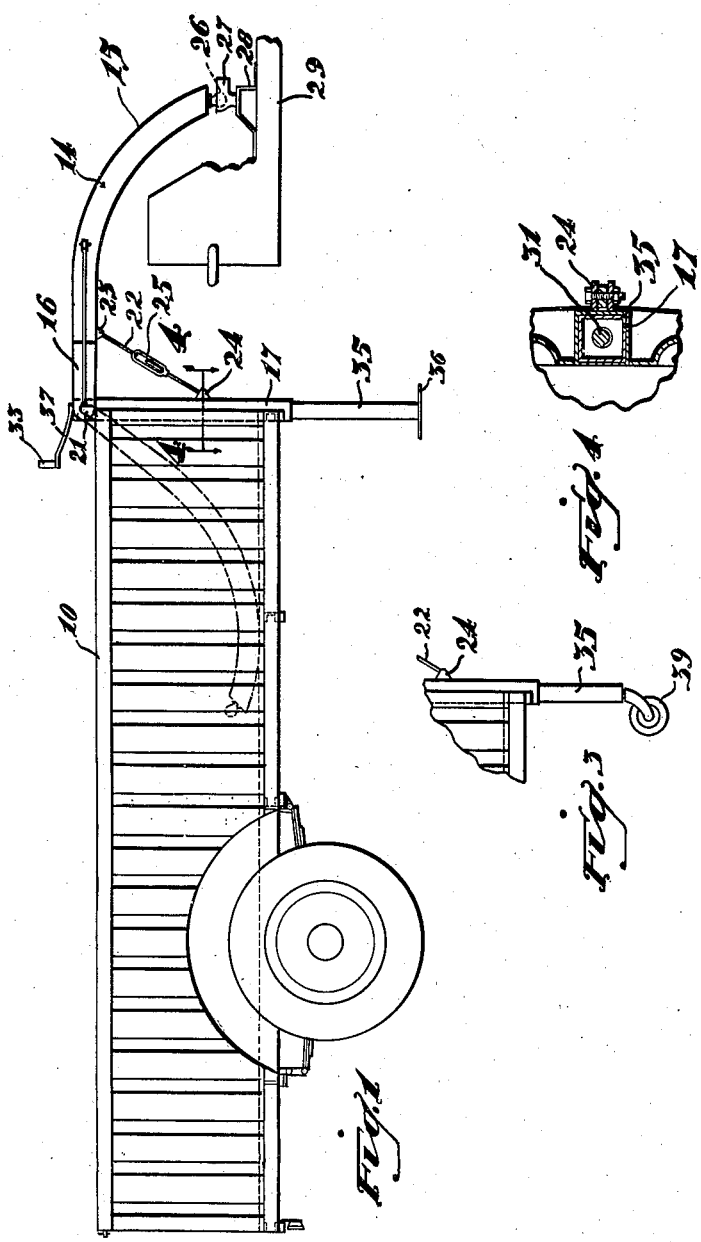
INVENTOR.
James J. Black
BY
Wood, Arey, Herron & Evans
Attorneys.

Jan. 15, 1946. J. J. BLACK 2,393,016
SEMI-TRAILER ATTACHMENT AND SUPPORT
Filed Nov. 15, 1943  2 Sheets-Sheet 2
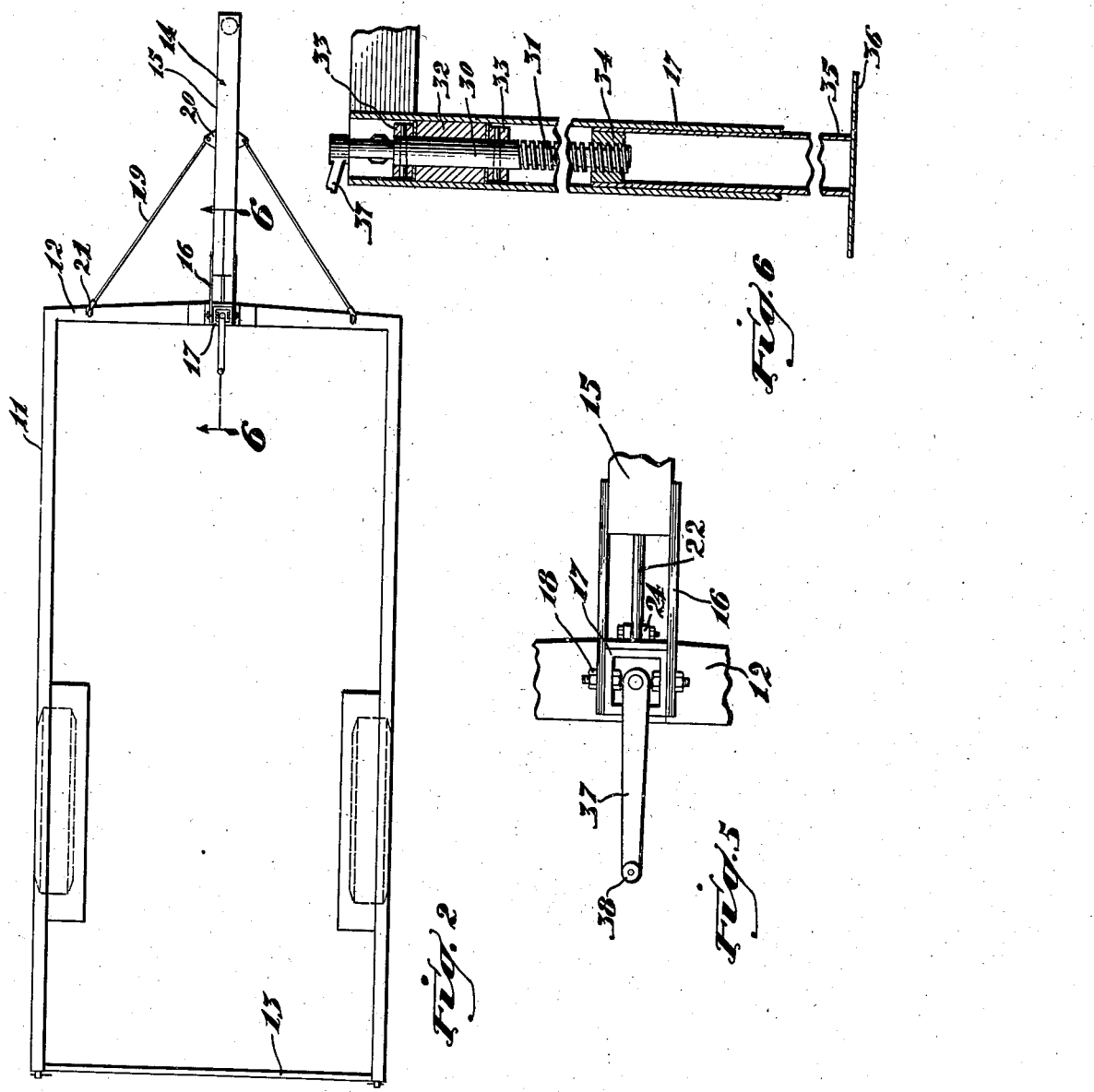
INVENTOR.
James J. Black
BY
Wood, Arey, Herron & Evans
Attorneys.

Patented Jan. 15, 1946

2,393,016

UNITED STATES PATENT OFFICE 2,393,016

SEMITRAILER ATTACHMENT AND SUPPORT

James J. Black, Cincinnati, Ohio, assignor to The Trailer Company of America, Cincinnati, Ohio, a corporation of Delaware Application November 15, 1943, Serial No. 510,291

3 Claims. (Cl. 280—33.4)

This invention relates to a semi-trailer vehicle preferably, although not necessarily, having a body of the open or cart type, and is particularly concerned with the means provided for attaching this general type of vehicle to a towing vehicle, such as for example, a military vehicle or a pleasure car, and the means provided for supporting the towed vehicle with respect to the towing vehicle during the operation of the latter.

The invention contemplates the use of a load supporting tongue of the goose neck type. This type of tongue is, generally speaking, stronger than the straight flat type of element and it provides an improved distribution of the strain of the load. In addition, the goose neck construction somewhat facilitates the problem of coupling the tongue to the towing vehicle. In the past, goose neck tongues conventionally have been rigidly connected to the front of the towed vehicle and have had a strong and heavy construction. This arrangement is objectionable because, in the first place, it adds substantially to the weight of the towed vehicle and, in the second place, the combined overall length of the vehicle and the tongue prevents the easy storage of the vehicle when not in use or during transportation from one place to another such as in a vessel, freight car or airplane.

One of the principal objects of the present invention has been to provide a vehicle of the semi-trailer type in which the load supporting tongue is of a goose neck construction which can be folded back into or adjacent the body of the vehicle when the latter is not in use.

Another object has been the provision of a tongue for a vehicle of the type described in which, by the utilization of bracing elements, the overall weight of the supporting elements including the tongue can be substantially reduced.

Another object has been the provision of a semi-trailer vehicle, preferably of the open or cart type, in which a simple yet effective prop is provided for elevating the front end of the vehicle.

Another object has been the association of the elements of the prop with the elements of the tongue to provide a unitary structure which is effective for the combined purposes of elevating the vehicle and manipulating the tongue for attachment of the towed vehicle to the towing vehicle.

Another object has been the provision of means for utilizing the prop to facilitate the attachment of the supporting braces of the tongue after the latter has been connected to the towing vehicle.

Other and further objects and advantages will be apparent from the further and more detailed description of the invention when considered in conjunction with the drawings in which:

Figure 1 is a somewhat diagrammatic side elevational view of a semi-trailer having a body of the cart type attached to a towing vehicle utilizing the various novel elements of the invention and with a prop extended in supporting position.

Figure 2 is a top plan view of the semi-trailer showing the tongue and supporting braces in extended and attached position.

Figure 3 is a fragmentary view of the extended end of the prop showing a modified construction.

Figure 4 is a sectional view along the line 4—4, Figure 1.

Figure 5 is a fragmentary top plan view of the upper end of the prop and the pivotal end of the tongue and particularly illustrates the association of these elements.

Figure 6 is a sectional view along the line 6—6, Figure 2, showing the details of the prop construction.

A wheeled vehicle of the semi-trailer type having a cart body is indicated generally at 10, Figure 1. The body may have side walls 11, a front wall 12 and a rear wall or tailgate 13. The tongue which is preferably of the curved or goose neck type is indicated generally at 14 and comprises the elements of a load supporting pole or bar 15 and a pair of straps 16 which pivotally secure the pole to the upper side edges of the outer prop element 17 on the upper surface of the front wall 12 of the vehicle body. This pivotal connection may be accomplished by means of the nut and bolt connection 18.

Lateral braces 19 of identical construction extend from the ears 20 on the pole 15 to the top of the front wall 12 of the vehicle and are there pivotally secured as at 21. The alignment of these points of pivotal connections of the braces with the point of pivotal connection of the tongue permits the folding back of the tongue and braces into the body of the trailer where the tongue assumes an unobtrusive position as illustrated in the dot and dash lines in Figure 1.

A tension bar 22 is pivotally but rigidly joined to the underside of the goose neck as at 23 and removably joined to the front wall of the trailer body as at 24. This rod serves to maintain the goose neck tongue in rigid position vertically with respect to the trailer body, particularly while the vehicle is in operation. A turnbuckle 25 may be utilized as an integral part of the tension rod and facilitates the attachment at the point 24.

At the forward end of the tongue a conventional ball and socket joint is employed, the ball being designated as 26 and the socket as 27. The latter may be integrally attached to a rib 28 on the chassis of the towing vehicle 29. As illustrated, this vehicle may be a military scout car of the type conventionally known as a jeep. However, the utility of the invention is not limited to its association with this particular type of vehicle and without departing from the scope of the invention no more than minor modifictaions are necessary to adapt the structure for use with any ordinary type of pleasure vehicle. Where the towing vehicle is a jeep, as shown in Figure 1, the tongue is conventionally mounted directly above the rear tonneau to engage with a socket joint on the floor in the manner illustrated.

Operating in conjunction with the tongue mechanism, the invention contemplates a simple yet effective prop construction which is best illustrated in Figure 6. The prop screw 30 having a screw threaded end portion 31 is supported in the block 32 and journalled in the collars 33. The nut 34 with which the screw engages is integrally secured to the side walls of the telescoping inner prop member 35. Both the inner prop member 35 and the outer member 17 are preferably of square tubular construction. A prop support 36 is secured to the lower end of the inner member and rests on the ground when the prop is extended. A crank 37 having a crank handle 38 is pinned to the upper screw shaft as illustrated in Figures 1 and 6. The prop is actuated from retracted to extended position by the operation of this crank which causes the screw threads 31 to engage with the nut 34 and elevates the lower end of the prop through the telescopic construction illustrated. In the modified construction illustrated in Figure 3, a caster may be employed at the lower end of the prop instead of the flat support element 36. This caster permits a sidewise movement of the front end of the vehicle which is useful in aligning the ball 26 with the socket 27 in hitching the two vehicles.

In the complete coupling action the prop is first partially extended to a support position. The tongue is then pivoted forwardly and the ball and socket connection is made. At this point the tension rod 22 is disconnected and it is essential that the connection be made before the prop is retracted. In the event that due to the length of the rod 22, particularly if no turnbuckle is employed, the connection cannot be made readily, the rod end may be manipulated with respect to the point of attachment 24 by the further elevation or retraction of the prop. When the connection has been made at point 24, the rod may be secured at this point as by a pin (not shown). The prop may then be retracted to running position. In this way, the manipulation of the prop actively cooperates in the effective operation of the tongue.

From the above description it will be apparent that the invention provides a goose neck tongue construction of extremely light weight, and one which has great flexibility in coupling, and rigidity in operation. When the goose neck is folded back into the vehicle the entire vehicle may occupy only a relatively small space which is very desirable for storage and shipping. By reason of the various instrumentalities shown, the coupling between the vehicle and the self-propelled vehicle may be accomplished readily and with a minimum of inconvenience and effort.

Having described my invention, I claim:

1. In a trailer vehicle having an open body of the cart type, a load supporting tongue of goose neck configuration and bracing elements for maintaining said tongue rigid against lateral movement, said tongue and said bracing elements being pivotally secured to the trailer along aligned pivotal points, disposed above the floor level of the vehicle whereby said tongue and bracing elements can be folded rearwardly and disposed in the trailer body and means for bracing said tongue against vertical movement when the tongue is in extended position.

2. Means for attaching a trailer vehicle to a towing vehicle, said means comprising a tongue of goose neck configuration, and horizontal and vertical bracing means for maintaining the tongue in rigid position during the operation of the vehicle, said tongue and horizontal bracing means being adapted to be pivotally secured to the trailer and said vertical bracing means being adapted to be detachably secured thereto whereby said tongue and bracing means may be folded rearwardly toward the body of the trailer.

3. In a semi-trailer, a load supporting tongue for attaching the semi-trailer to a towing vehicle, said tongue being pivotally secured to the semi-trailer and being foldable rearwardly, bracing means for maintaining said tongue in rigid position vertically when it is in extended position, said bracing means being detachable when the tongue is folded rearwardly and jack means for elevating or lowering the front of the semi-trailer to facilitate attachment of the bracing means after the tongue has been moved from folded to extended position and secured to a towing vehicle.

JAMES J. BLACK.